Oct. 5, 1926.
R. CONRADER
1,601,943
PRESSURE RESPONSIVE DEVICE
Filed Sept. 30, 1925
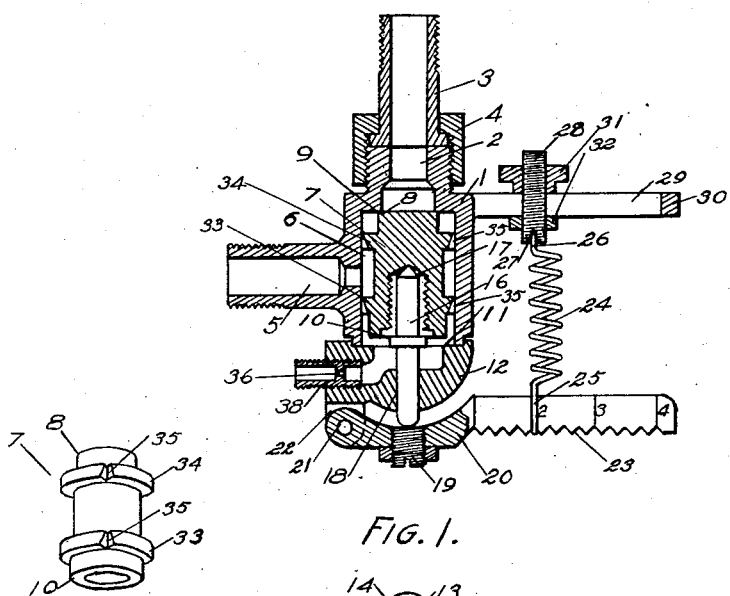
FIG. 1.
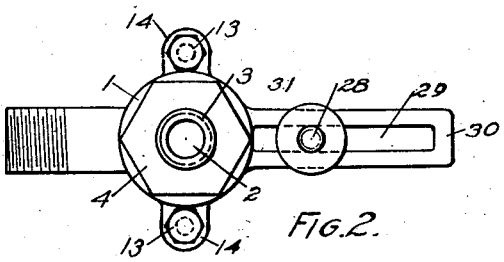
FIG. 4.
FIG. 2.
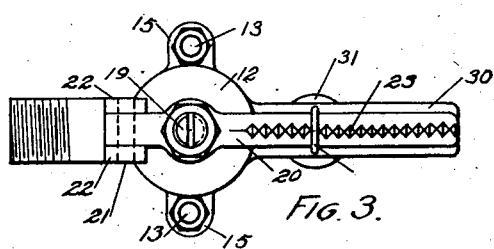
FIG. 3.
Inventor
Rudolph Conrader
By
Attorney Patented Oct. 5, 1926.

1,601,943

UNITED STATES PATENT OFFICE.

RUDOLPH CONRADER, OF ERIE, PENNSYLVANIA.

PRESSURE-RESPONSIVE DEVICE.

Application filed September 30, 1925. Serial No. 59,656.

This invention is designed to improve pressure responsive devices so as to simplify the construction and feasibility of adjustment. Such devices have heretofore been made in which there are opposing valves with different pressure exposed areas, said valves opening at a pre-determined pressure and remaining open through the difference in pressure of the valve exposed areas until the pressure is reduced to a pre-determined pressure. Such devices require adjustment for different pressures and it is also desirable to have them adjustable as to the range of pressure between the opening of the device and the closing of the same. With the present device this is readily accomplished and a very wide range established in a very simple and efficient manner. These features and others will appear more fully from the specification and claims.

The invention is illustrated in the accompanying drawings as follows:—

Fig. 1 shows a central section through the device.

Fig. 2 a plan of the device, viewed from the top.

Fig. 3 a similar view, viewed from the bottom.

Fig. 4 a perspective view of the valve plunger and valve.

1 marks the body. This has an inlet passage 2 leading from an inlet pipe 3, the inlet pipe being secured by a flanged nut 4. The body is also provided with a discharge passage 5 extending from the side of the body. The body is provided with a cylinder 6 and a valve plunger 7 operated in this cylinder. The valve plunger has a valve 8 at the inlet end which operates on a seat 9 at the end of the cylinder. The plunger is also provided with a valve seat 10 which operates upon a valve seat 11 at the opposite end of the cylinder. The exposed area on the valve with the valve closed as shown in Fig. 1 is slightly less than the pressure on the valve when it is seated on the seat 11.

The seat 11 is arranged on a head 12 which is secured to the body by means of bolts 13, these bolts extending through ears 14 and 15 on the body and head respectively.

A push pin 16 is seated in a socket 17 in the plunger 7 and extends through an opening 18 in the head 12. It operates against a hardened pin 19 in the lever 20.

The lever 20 is pivoted on a pin 21 carried by ears 22 on the body 1. The lever is provided with a series of notches 23 and a spring 24 has loops 25 at its end which is adapted to seat in the notches 23. The upper end of the spring has a similar loop 26 which is secured in a notch 27 at the end of an adjusting screw 28. The adjusting screw 28 extends through a slot 29 in an arm 30 extending from the body and the screw is provided with a nut 31 by means of which the strength of the spring, or initial tension may be adjusted. A lock nut 32 is provided for locking the screw as adjusted.

The valve plunger has closure rings 33 and 34 which also act as guides in the cylinder. These are provided with minute openings 35 which are tapered toward the outlet, the purpose of these openings being to prevent clogging, anything passing the smaller end being readily discharged through this opening.

A waste opening 36 is arranged in a fitting 38 and this fitting is secured in the head 12 outside of the seat 11.

It will be noted that the opening from the seat 11 is to the atmosphere through the minute opening 36 and that the valve 8 is between the inlet and discharge.

The operation of the device is as follows: When the pressure at the inlet becomes above the desired maximum it opens the valve against the spring pressure and as soon as opened by reason of the exposed area of the seat it is snapped to force it to the opposing seat. The increased area of the opposed or outlet seat gives a greater exposed area of valve so that it remains on this seat until the pressure is so reduced that the spring will readily return the valve 8 to the seat 9. As soon as the valve 10 starts from its seat pressure is delivered below the valve and held momentarily by reason of the minute character of the opening 36, thus balancing the valve for the moment until it is seated.

By adjusting the spring 24 any initial resistance may be provided so as to give the desired maximum pressure at which the valve will open. The range between the opening and closing is accomplished by adjusting the spring along the lever 20. When the spring is adjusted toward the outer end of the lever the spring is more extended than toward the inner end of the lever with the opening of the valve and consequently a greater difference of pressure is delivered to the valve in its open position than when the spring is adjusted toward the inner end of the valve. The consequence is that the range of pressure between the opening and closing is much less with the spring arranged at the outer end of the lever 20 than at the inner end of the lever 20. In this way a very wide range of opening and closing pressures may be easily accomplished.

What I claim as new is:—

1. In a pressure responsive device, the combination of a body having opposing valve seats; connecting valves operating alternately on said seats, the pressure exposed area on one valve being greater than the pressure exposed area on the other valve; and a counter-pressure mechanism comprising a lever, and adjustable spring actuated pressure means adjustable along the lever.

2. In a pressure responsive device, the combination of a body having opposing valve seats; connecting valves operating alternately on said seats, the pressure exposed area on one valve being greater than the pressure exposed area on the other valve; and a counter-pressure mechanism comprising a lever and pressure means adjustable along the lever comprising a spring.

3. In a pressure responsive device, the combination of a body having opposing valve seats; connecting valves operating alternately on said seats, the pressure exposed area on one valve being greater than the pressure exposed area on the other valve; and a counter-pressure mechanism comprising a lever, pressure means adjustable along the lever, and adjusting means for the pressure means.

In testimony whereof I have hereunto set my hand.

RUDOLPH CONRADER.